(12) United States Patent
Fornell et al.

(10) Patent No.: US 12,741,899 B2
(45) Date of Patent: Sep. 22, 2026

(54) CONVEYANCE APPARATUS AND METHOD WITH ADJUSTABLE FLUID FLOW

(71) Applicant: CORNING INCORPORATED, Corning, NY (US)

(72) Inventors: Nils Paul Fornell, Harrodsburg, KY (US); Keith Mitchell Hill, Horseheads, NY (US); Craig Gene Stewart, Lawrenceville, PA (US)

(73) Assignee: CORNING INCORPORATED, Corning, NY (US)

( * ) Notice: Subject to any disclaimer, the term of this patent is extended or adjusted under 35 U.S.C. 154(b) by 57 days.

(21) Appl. No.: 18/701,432

(22) PCT Filed: Sep. 30, 2022

(86) PCT No.: PCT/US2022/045295
§ 371 (c)(1),
(2) Date: Apr. 15, 2024

(87) PCT Pub. No.: WO2023/075985
PCT Pub. Date: May 4, 2023

(65) Prior Publication Data

US 2025/0304485 A1 Oct. 2, 2025

Related U.S. Application Data

(60) Provisional application No. 63/272,852, filed on Oct. 28, 2021.

(51) Int. Cl.
*C03B 35/24* (2006.01)

(52) U.S. Cl.
CPC .................................. *C03B 35/246* (2013.01)

(58) Field of Classification Search
CPC ...... B65G 51/03; B65G 49/065; C03B 29/12; C03B 17/062; C03B 35/184
See application file for complete search history.

(56) References Cited

U.S. PATENT DOCUMENTS 3,355,275 A * 11/1967 Sensi .................... C03B 17/062 65/99.2
3,374,078 A * 3/1968 Wright .................... C03B 35/24 414/676

(Continued)

FOREIGN PATENT DOCUMENTS

CN 1454186 A 11/2003
CN 1890123 B 6/2010

(Continued)

OTHER PUBLICATIONS

International Search Report and Written Opinion of the International Searching Authority; PCT/US2022/045295; dated Jan. 30, 2023; 12 pages; Korean Patent Office.
Taiwanese Patent Application No. 111137618, Office Action dated Jan. 15, 2026, 5 pages (English Translation only), Taiwanese Patent Office.

(Continued)

*Primary Examiner* — Erin Snelting
*Assistant Examiner* — Steven S Lee

(57) ABSTRACT

A method and apparatus for manufacturing a glass article includes a glass conveyance apparatus that includes a plenum chamber having a fluid inlet, a plurality of slide gates in fluid communication with the plenum chamber that include a plurality of apertures and are movable from a first position to a second position, and a fluid bearing table proximate the plurality of slide gates that includes a plurality of orifices.

22 Claims, 7 Drawing Sheets

(56) References Cited

U.S. PATENT DOCUMENTS

| | | | | |
|---|---|---|---|---|
| 3,522,029 | A * | 7/1970 | Carson | C03B 27/0404 65/351 |
| 4,185,986 | A * | 1/1980 | Frank | C03B 23/03 65/273 |
| 4,198,463 | A * | 4/1980 | Greenhalgh | C03B 27/0413 428/220 |
| 4,308,046 | A | 12/1981 | Toussaint et al. | |
| 5,156,664 | A | 10/1992 | Maltby et al. | |
| 6,279,898 | B1 | 8/2001 | Stephan | |
| 2003/0014997 | A1 | 1/2003 | Dunifon | |
| 2007/0099556 | A1 | 5/2007 | Lehnert | |
| 2009/0205373 | A1 * | 8/2009 | Kojima | C03B 40/04 65/253 |
| 2015/0251944 | A1 * | 9/2015 | Brackley | B26D 7/32 83/76.8 |
| 2019/0177202 | A1 | 6/2019 | Mori et al. | |
| 2020/0189952 | A1 | 6/2020 | Boisselle et al. | |
| 2021/0292221 | A1 | 9/2021 | Fournel et al. | |

FOREIGN PATENT DOCUMENTS

| | | | | |
|---|---|---|---|---|
| CN | 104513003 | A * | 4/2015 | C03B 27/012 |
| CN | 109982950 | A | 7/2019 | |
| CN | 110167893 | A | 8/2019 | |
| CN | 108910534 | B | 6/2020 | |
| JP | 2001192226 | A * | 7/2001 | C03B 27/0445 |
| JP | 2004131379 | A * | 4/2004 | C03B 27/0404 |
| JP | 2010254453 | A * | 11/2010 | |
| KR | 10-0706534 | B1 | 4/2007 | |
| TW | 201811688 | A | 4/2018 | |
| WO | WO-2008044706 | A1 * | 4/2008 | H10P 72/36 |
| WO | WO-2018052833 | A1 * | 3/2018 | C03B 17/062 |

OTHER PUBLICATIONS

Chinese Patent Application No. 202280072807.9, Office Action dated May 16, 2026, 4 pages (English Translation only), Chinese Patent Office.

* cited by examiner

CONVEYANCE APPARATUS AND METHOD WITH ADJUSTABLE FLUID FLOW

CROSS-REFERENCE TO RELATED APPLICATIONS

This application claims the benefit of priority under 35 U.S.C. § 119 of U.S. Provisional Application Ser. No. 63/272,852, filed on Oct. 28, 2021, the content of which is relied upon and incorporated herein by reference in its entirety.

FIELD

The present disclosure relates generally to methods and apparatuses for conveying glass and more particularly to methods and apparatuses for conveying glass with adjustable fluid flow.

BACKGROUND

In the production of glass articles, such as glass sheets for display applications, including televisions and hand-held devices, such as telephones and tablets, a glass ribbon can be flowed from a forming device. As the glass ribbon is flowed from the forming device, it can be conveyed for further processing into individual glass articles or sheets. During such conveyance, it is preferable to minimize physical contact to the quality area (i.e., non-edge area) of the glass ribbon in order to prevent scratches or other defects on the glass ribbon surface. As glass ribbons become thinner and/or wider, conveyance of the glass ribbon without physically contacting the quality area, while at the same time preventing undesirable deformation (e.g., sagging) of the glass ribbon area becomes increasingly difficult. Accordingly, improved methods for conveying thin and/or wide glass ribbons are increasingly desired.

SUMMARY

Embodiments disclosed herein include an apparatus for manufacturing a glass article. The apparatus includes a glass conveyance apparatus. The glass conveyance apparatus includes a plenum chamber including a fluid inlet. The glass conveyance apparatus also includes a plurality of slide gates in fluid communication with the plenum chamber that are movable from a first position to a second position. Each of the plurality of slides gates includes a plurality of apertures. In addition, the glass conveyance apparatus includes a fluid bearing table proximate the plurality of slide gates, the fluid bearing table including a plurality of orifices. The plenum chamber is not in fluid communication with at least one orifice when at least one slide gate is in the first position and the plenum chamber is in fluid communication with at least one orifice when at least one slide gate is in the second position.

Embodiments disclosed herein also include a glass conveyance apparatus. The glass conveyance apparatus includes a plenum chamber including a fluid inlet. The glass conveyance apparatus also includes a plurality of slide gates in fluid communication with the plenum chamber that are movable from a first position to a second position. Each of the plurality of slides gates includes a plurality of apertures. In addition, the glass conveyance apparatus includes a fluid bearing table proximate the plurality of slide gates, the fluid bearing table including a plurality of orifices. The plenum chamber is not in fluid communication with at least one orifice when at least one slide gate is in the first position and the plenum chamber is in fluid communication with at least one orifice when at least one slide gate is in the second position.

In addition, embodiments disclosed herein include a method of manufacturing a glass article. The method includes flowing a glass ribbon from a forming device and towards a glass conveyance apparatus in a draw direction. The glass conveyance apparatus includes a plenum chamber including a fluid inlet. The glass conveyance apparatus also includes a plurality of slide gates in fluid communication with the plenum chamber that are movable from a first position to a second position. Each of the plurality of slides gates includes a plurality of apertures. In addition, the glass conveyance apparatus includes a fluid bearing table proximate the plurality of slide gates, the fluid bearing table including a plurality of orifices. The plenum chamber is not in fluid communication with at least one orifice when at least one slide gate is in the first position and the plenum chamber is in fluid communication with at least one orifice when at least one slide gate is in the second position.

Additional features and advantages of the embodiments disclosed herein will be set forth in the detailed description which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description explain the principles and operations thereof.

DETAILED DESCRIPTION

Figure 1:
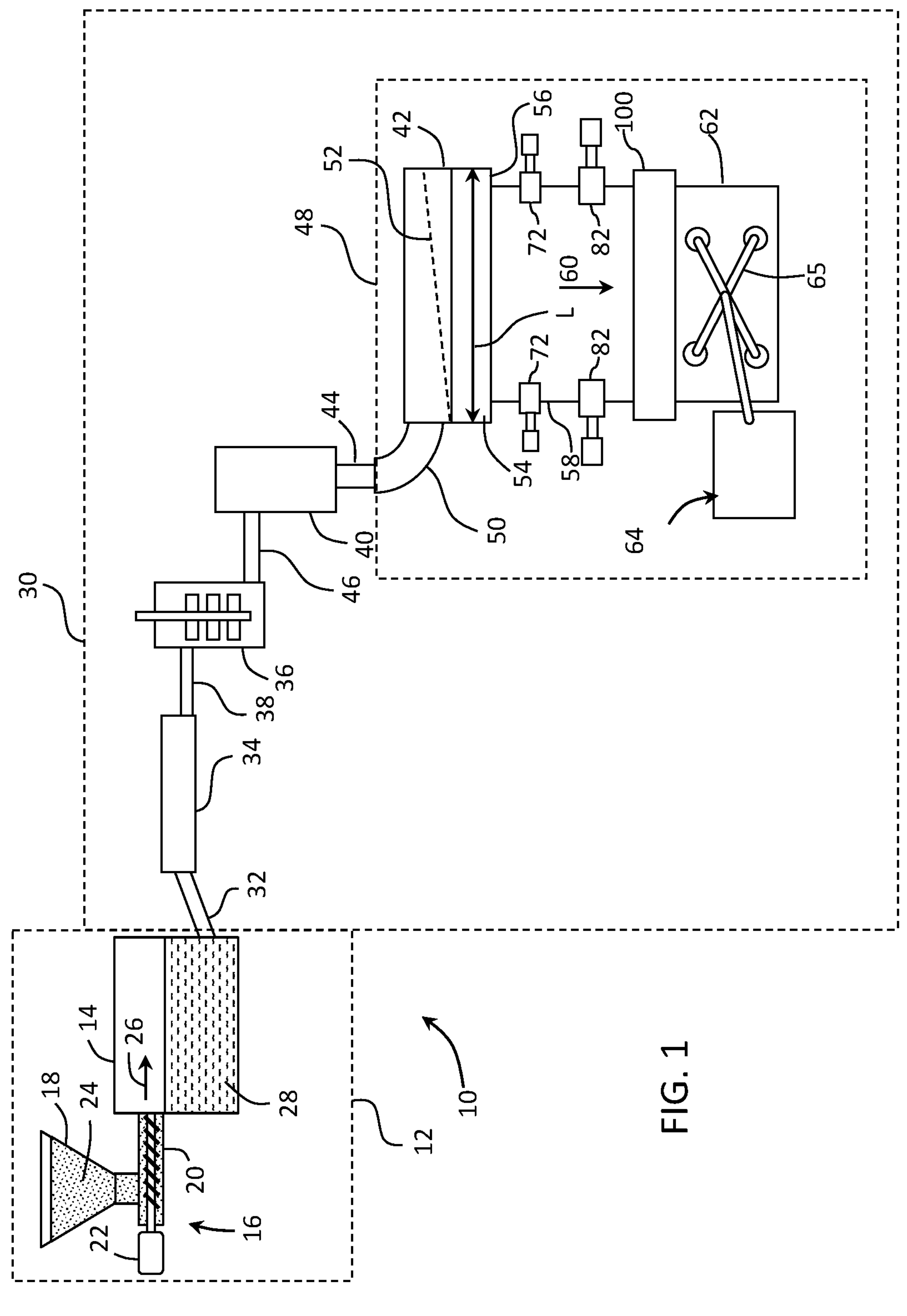
FIG. 1 is a schematic view of an example fusion down draw glass-making apparatus and process.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, for example by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "cooling mechanism" refers to a mechanism that provides increased heat transfer from an area relative to a condition where such cooling mechanism is absent. The heat transfer can occur through at least one of conduction, convection, or radiation.

As used herein, the term "heating mechanism" refers to a mechanism that provides reduced heat transfer from an area or increased heat transfer to an area relative to a condition where such heating mechanism is absent. The heat transfer can occur through at least one of conduction, convection, or radiation.

As used herein, the term "housing" refers to an enclosure in which a glass ribbon is formed, wherein as the glass ribbon travels through the housing, it generally cools from a relatively higher to relatively lower temperature. While embodiments disclosed herein have been described with reference to a fusion down draw process, wherein a glass ribbon flows down through a housing in a generally vertical direction, such embodiments are also applicable to other glass forming processes, such as float processes, slot draw processes, up-draw processes, and press-rolling processes, wherein the glass ribbon may flow through the housing in a variety of directions, such as a generally vertical direction or a generally horizontal direction.

Shown in FIG. 1 is an exemplary glass manufacturing apparatus 10. In some examples, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners or electrodes) that heat raw materials and convert the raw materials into molten glass. In further examples, glass melting furnace 12 may include thermal management devices (e.g., insulation components) that reduce heat lost from a vicinity of the melting vessel. In still further examples, glass melting furnace 12 may include electronic devices and/or electromechanical devices that facilitate melting of the raw materials into a glass melt. Still further, glass melting furnace 12 may include support structures (e.g., support chassis, support member, etc.) or other components.

Glass melting vessel 14 is typically comprised of refractory material, such as a refractory ceramic material, for example a refractory ceramic material comprising alumina or zirconia. In some examples glass melting vessel 14 may be constructed from refractory ceramic bricks. Specific embodiments of glass melting vessel 14 will be described in more detail below.

In some examples, the glass melting furnace may be incorporated as a component of a glass manufacturing apparatus to fabricate a glass substrate, for example a glass ribbon of a continuous length. In some examples, the glass melting furnace of the disclosure may be incorporated as a component of a glass manufacturing apparatus comprising a slot draw apparatus, a float bath apparatus, a down-draw apparatus such as a fusion process, an up-draw apparatus, a press-rolling apparatus, a tube drawing apparatus or any other glass manufacturing apparatus that would benefit from the aspects disclosed herein. By way of example, FIG. 1 schematically illustrates glass melting furnace 12 as a component of a fusion down-draw glass manufacturing apparatus 10 for fusion drawing a glass ribbon for subsequent processing into individual glass sheets.

The glass manufacturing apparatus 10 (e.g., fusion down-draw apparatus 10) can optionally include an upstream glass manufacturing apparatus 16 that is positioned upstream relative to glass melting vessel 14. In some examples, a portion of, or the entire upstream glass manufacturing apparatus 16, may be incorporated as part of the glass melting furnace 12.

As shown in the illustrated example, the upstream glass manufacturing apparatus 16 can include a storage bin 18, a raw material delivery device 20 and a motor 22 connected to the raw material delivery device. Storage bin 18 may be configured to store a quantity of raw materials 24 that can be fed into melting vessel 14 of glass melting furnace 12, as indicated by arrow 26. Raw materials 24 typically comprise one or more glass forming metal oxides and one or more modifying agents. In some examples, raw material delivery device 20 can be powered by motor 22 such that raw material delivery device 20 delivers a predetermined amount of raw materials 24 from the storage bin 18 to melting vessel 14. In further examples, motor 22 can power raw material delivery device 20 to introduce raw materials 24 at a controlled rate based on a level of molten glass sensed downstream from melting vessel 14. Raw materials 24 within melting vessel 14 can thereafter be heated to form molten glass 28.

Glass manufacturing apparatus 10 can also optionally include a downstream glass manufacturing apparatus 30 positioned downstream relative to glass melting furnace 12. In some examples, a portion of downstream glass manufacturing apparatus 30 may be incorporated as part of glass melting furnace 12. In some instances, first connecting conduit 32 discussed below, or other portions of the downstream glass manufacturing apparatus 30, may be incorporated as part of glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy including from about 70 to about 90% by weight platinum and about 10% to about 30% by weight rhodium. However, other suitable metals can include molybdenum, palladium, rhenium, tantalum, titanium, tungsten and alloys thereof.

Downstream glass manufacturing apparatus 30 can include a first conditioning (i.e., processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may cause molten glass 28 to pass through an interior pathway of first connecting conduit 32 from melting vessel 14 to fining vessel 34. However, other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated to continue the melting process or cooled to a temperature lower than the temperature of the molten glass in the melting vessel before entering the fining vessel.

Bubbles may be removed from molten glass 28 within fining vessel 34 by various techniques. For example, raw materials 24 may include multivalent compounds (i.e. fining agents) such as tin oxide that, when heated, undergo a chemical reduction reaction and release oxygen. Other suitable fining agents include without limitation arsenic, antimony, iron and cerium. Fining vessel 34 is heated to a temperature greater than the melting vessel temperature, thereby heating the molten glass and the fining agent. Oxygen produced by the temperature-induced chemical reduction of the fining agent(s) can diffuse or coalesce into bubbles produced in the molten glass during the melting process. The enlarged gas bubbles can then rise to a free surface of the molten glass in the fining vessel and thereafter be vented out of the fining vessel. The bubbles can further induce mechanical mixing of the molten glass in the fining vessel.

Downstream glass manufacturing apparatus 30 can further include another conditioning vessel such as a mixing vessel 36 for mixing the molten glass. Mixing vessel 36 may be located downstream from the fining vessel 34. Mixing vessel 36 can be used to provide a homogenous glass melt composition, thereby reducing cords of chemical or thermal inhomogeneity that may otherwise exist within the fined molten glass exiting the fining vessel. As shown, fining vessel 34 may be coupled to mixing vessel 36 by way of a second connecting conduit 38. In some examples, molten glass 28 may be gravity fed from the fining vessel 34 to mixing vessel 36 by way of second connecting conduit 38. For instance, gravity may cause molten glass 28 to pass through an interior pathway of second connecting conduit 38 from fining vessel 34 to mixing vessel 36. While mixing vessel 36 is shown downstream of fining vessel 34, mixing vessel 36 may be positioned upstream from fining vessel 34. In some embodiments, downstream glass manufacturing apparatus 30 may include multiple mixing vessels, for example a mixing vessel upstream from fining vessel 34 and a mixing vessel downstream from fining vessel 34. These multiple mixing vessels may be of the same design, or they may be of different designs.

Downstream glass manufacturing apparatus 30 can further include another conditioning vessel such as delivery vessel 40 that may be located downstream from mixing vessel 36. Delivery vessel 40 may condition molten glass 28 to be fed into a downstream forming device. For instance, delivery vessel 40 can act as an accumulator and/or flow controller to adjust and/or provide a consistent flow of molten glass 28 to forming body 42 by way of exit conduit 44. As shown, mixing vessel 36 may be coupled to delivery vessel 40 by way of third connecting conduit 46. In some examples, molten glass 28 may be gravity fed from mixing vessel 36 to delivery vessel 40 by way of third connecting conduit 46. For instance, gravity may drive molten glass 28 through an interior pathway of third connecting conduit 46 from mixing vessel 36 to delivery vessel 40.

Downstream glass manufacturing apparatus 30 can further include forming apparatus 48 comprising the above-referenced forming body 42 and inlet conduit 50. Exit conduit 44 can be positioned to deliver molten glass 28 from delivery vessel 40 to inlet conduit 50 of forming apparatus 48. For example, exit conduit 44 may be nested within and spaced apart from an inner surface of inlet conduit 50, thereby providing a free surface of molten glass positioned between the outer surface of exit conduit 44 and the inner surface of inlet conduit 50. Forming body 42 in a fusion down draw glass-making apparatus can comprise a trough 52 positioned in an upper surface of the forming body 42 and converging forming surfaces 54 that converge in a draw direction along a bottom edge 56 of the forming body 42. Molten glass delivered to the forming body trough via delivery vessel 40, exit conduit 44 and inlet conduit 50 overflows side walls of the trough and descends along the converging forming surfaces 54 as separate flows of molten glass. The separate flows of molten glass join below and along bottom edge 56 to produce a single ribbon of glass 58 that is drawn in a draw or flow direction 60 from bottom edge 56 by applying tension to the glass ribbon, such as by gravity, edge rolls 72 and pulling rolls 82, to control the dimensions of the glass ribbon as the glass cools and a viscosity of the glass increases. Accordingly, glass ribbon 58 goes through a visco-elastic transition and acquires mechanical properties that give the glass ribbon 58 stable dimensional characteristics. Glass ribbon 58 may, in some embodiments, be separated into individual glass sheets 62 by a glass separation apparatus 100 in an elastic region of the glass ribbon. A robot 64 may then transfer the individual glass sheets 62 to a conveyor system using gripping tool 65, whereupon the individual glass sheets may be further processed.

Figures 2, 3:
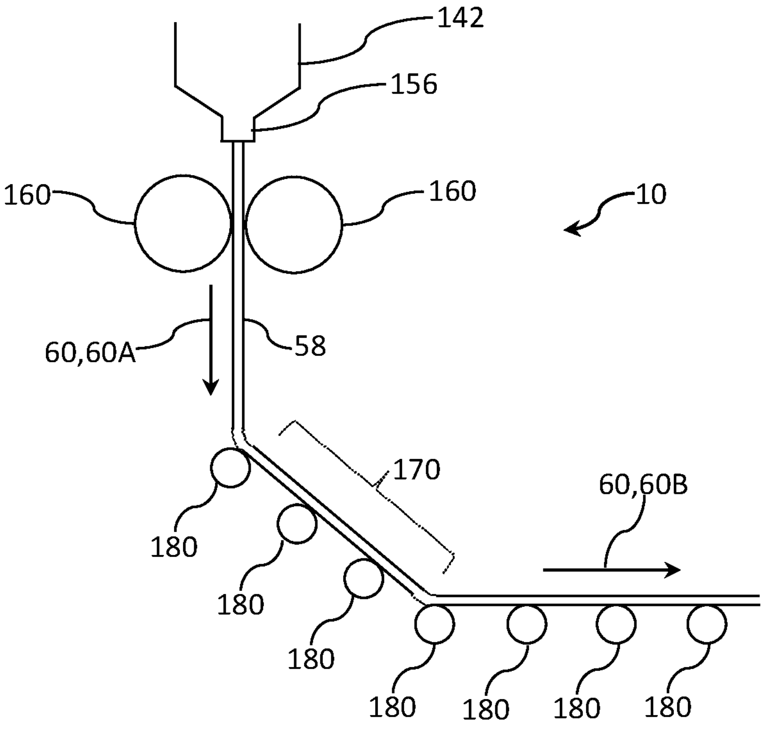
FIG. 2 is a side schematic perspective view of an example glass manufacturing apparatus and process.
FIG. 3 is a top perspective view of a glass conveyance apparatus in accordance with embodiments disclosed herein.

FIG. 2 shows a schematic perspective view of an example glass manufacturing apparatus 10 and process. Glass manufacturing apparatus 10 and process of FIG. 2 is similar to that of FIG. 1 except that in FIG. 2, the forming device comprises a forming vessel 142 comprising a slot 156 from which glass ribbon 58 flows in a draw direction 60. In addition, in FIG. 2, the glass manufacturing apparatus comprises a pair of opposing forming rolls 160 downstream of slot 156 which can be configured to contact opposing major surfaces of glass ribbon 58. Glass manufacturing apparatus 10 also comprises reorientation mechanism 170 configured to reorient the draw direction 60 from substantially vertical 60A (i.e., parallel to a gravity force vector) between the forming device (comprising forming vessel 142) and the reorientation mechanism 170 to substantially horizontal 60B downstream of the reorientation mechanism 170. As shown in FIG. 2, reorientation mechanism 170 comprises a plurality of rollers 180, each roller configured to contact edge regions of glass ribbon 58. Rollers 180 may also facilitate horizontal conveyance of glass ribbon 58 downstream of reorientation mechanism 170.

FIG. 3 shows a top perspective view of a glass conveyance apparatus 200 in accordance with embodiments disclosed herein. Glass conveyance apparatus 200 includes plenum chamber 206 and mounting bracket 208. Glass conveyance apparatus 200 also includes a fluid bearing table 202 comprising a plurality of orifices 204 (e.g., an array of orifices 204) that each extend through a thickness of fluid bearing table 202.

Plenum chamber 206 may, for example, comprise stainless steel, aluminum, or Inconel. Fluid bearing table 202 may, for example, comprise stainless steel, aluminum, Inconel, a ceramic material, or a polymeric material. Orifices 204 may, for example, have diameters ranging from about 0.5 millimeters to about 3 millimeters.

Figure 4:
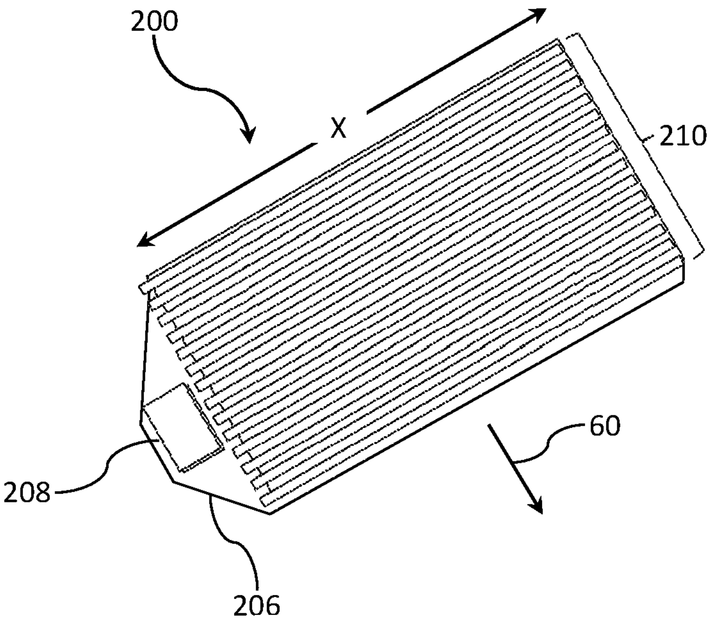
FIG. 4 is a top perspective view of a portion of a glass conveyance apparatus in accordance with embodiments disclosed herein.
Figure 5:
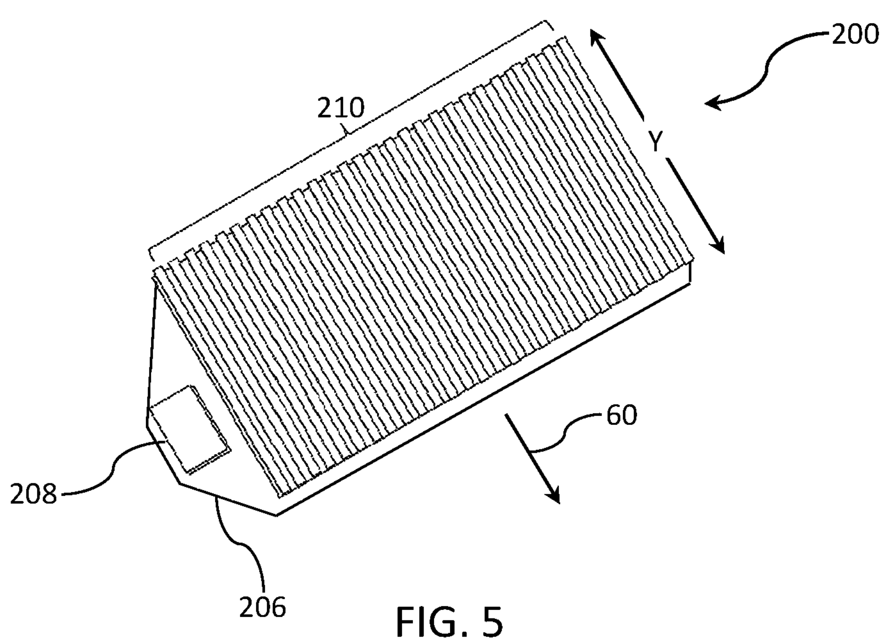
FIG. 5 is a top perspective view of a portion of a glass conveyance apparatus in accordance with embodiments disclosed herein.

FIGS. 4 and 5 show top perspective views of a portion of a glass conveyance apparatus 200 in accordance with embodiments disclosed herein, wherein fluid bearing table 202 is not shown. As shown in FIGS. 4 and 5, glass conveyance apparatus 200 includes a plurality of slide gates 210 in fluid communication with plenum chamber 206. In FIG. 4, slide gates 210 are movable in the directions shown by double arrow 'X' and in FIG. 5, slide gates 210 are movable in the directions shown by double arrow 'Y.' Specifically, in FIG. 4, slide gates 210 are movable in a direction perpendicular to draw direction 60 and in FIG. 5, slide gates 210 are movable in a direction parallel to draw direction 60.

Figure 6:
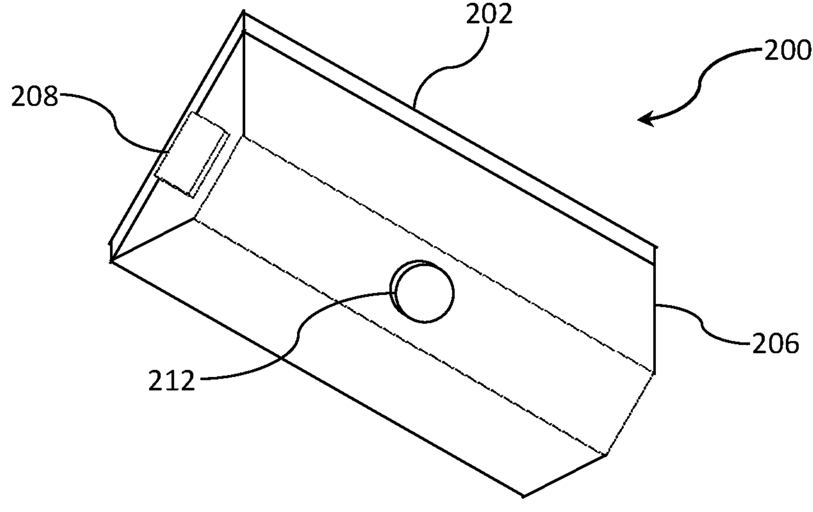
FIG. 6 is a bottom perspective view of a glass conveyance apparatus in accordance with embodiments disclosed herein.

FIG. 6 shows a bottom perspective view of a glass conveyance apparatus 200 in accordance with embodiments disclosed herein. As shown in FIG. 6, plenum chamber 206 comprises fluid inlet 212. Fluid inlet 212 can facilitate flow of a fluid from a fluid source (not shown) into plenum chamber 206.

While fluid flowed through fluid inlet 212 into plenum chamber 206 may comprise at least one of a gas or a liquid, in certain exemplary embodiments, the fluid comprises a gas, such as air. For example, the fluid may comprise at least one of nitrogen, oxygen, hydrogen, helium, argon, or combinations thereof. The fluid may also consist or consist essentially of at least one of nitrogen, oxygen, hydrogen, helium, argon, or a combination thereof.

Figure 7:
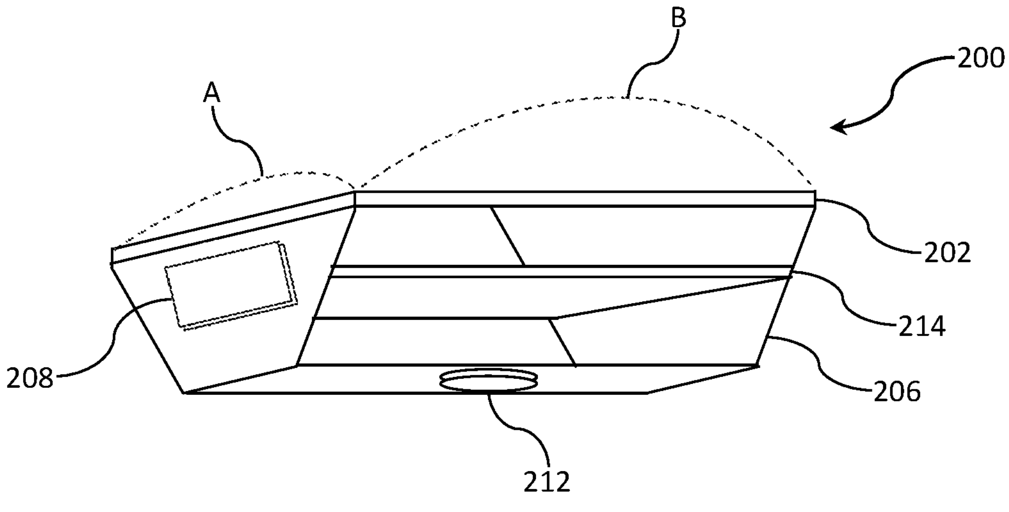
FIG. 7 is a side perspective view of a portion of a glass conveyance apparatus in accordance with embodiments disclosed herein.

FIG. 7 shows a side perspective view of a portion of a glass conveyance apparatus 200 in accordance with embodiments disclosed herein, wherein a side of plenum chamber 206 is not shown. As shown in FIG. 7, glass conveyance apparatus 200 includes a fluid diffuser 214. Fluid diffuser 214 is positioned within plenum chamber 206 and extends between fluid inlet 212 and plurality of slide gates 210 (shown, for example, in FIGS. 4 and 5).

FIGS. 4, 6, and 7 show a glass conveyance apparatus 200 having a fluid bearing table 202 comprising a substantially planar surface. Embodiment disclosed herein may also comprise a conveyance apparatus 200 having a fluid bearing table 202 comprising other surface geometries, such as a non-planar surface. For example, as shown by the dashed lines 'A' and 'B' of FIG. 7, fluid bearing table 202 may have a curved surface in one or more directions.

Figures 8, 9A, 9B, 9C, 9D:
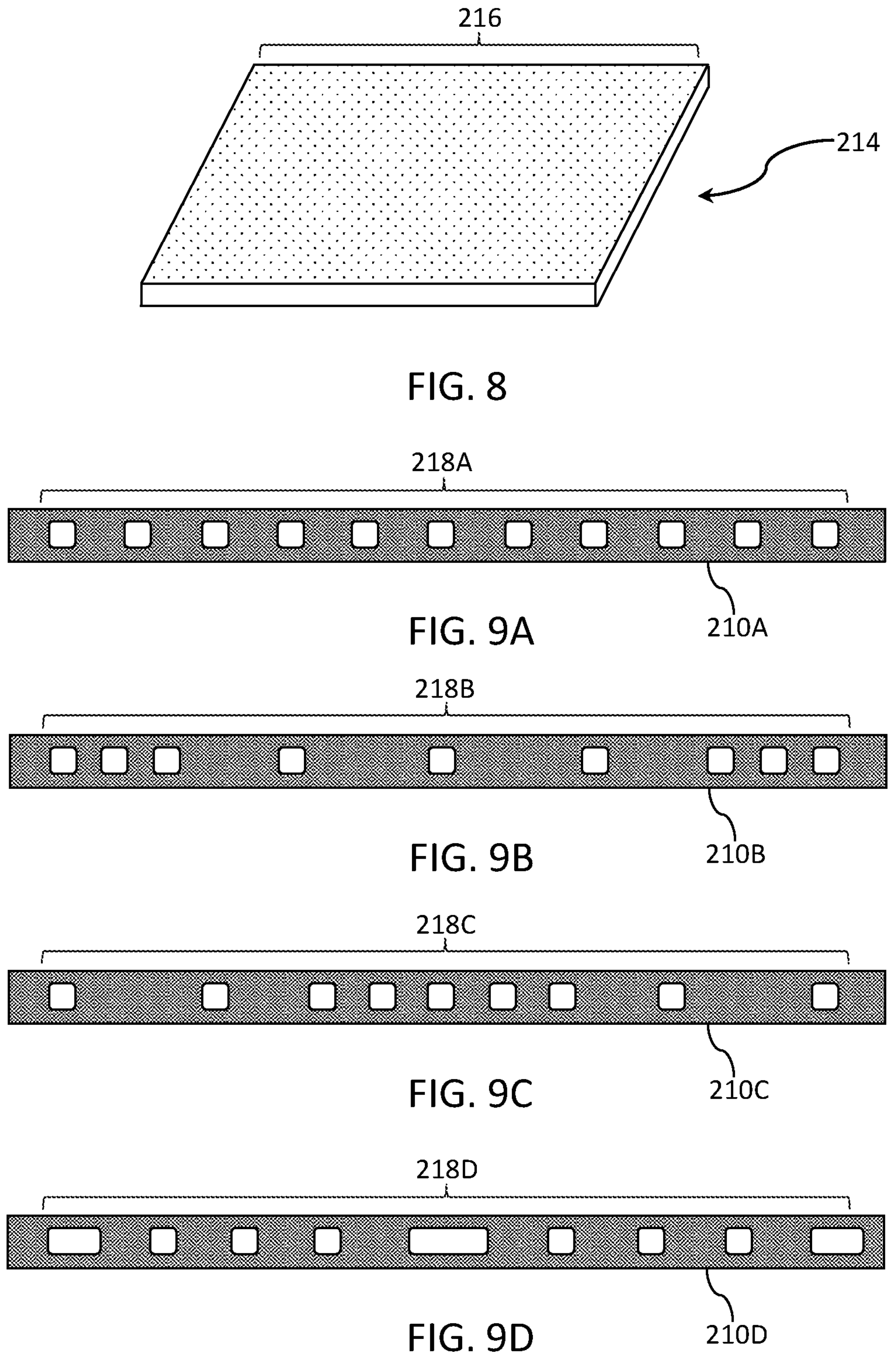
FIG. 8 is a top perspective view of a fluid diffuser in accordance with embodiments disclosed herein.
FIGS. 9A-9D are top perspective views of slide gates in accordance with embodiments disclosed herein.

FIG. 8 shows a top perspective view of a fluid diffuser 214 in accordance with embodiments disclosed herein. Fluid diffuser 214 comprises a plurality of perforations or orifices 216 through which a fluid may pass from one major surface (i.e., facing fluid inlet 212) to the other major surface (i.e., facing slide gates 210) of fluid diffuser 214. When positioned inside plenum chamber 206 as shown, for example, in FIG. 7, fluid diffuser 214 acts to redistribute fluid flow, such that fluid flow and pressure are more evenly distributed in the region of plenum chamber 206 between fluid diffuser 214 and slide gates 210 (i.e., in the region of plenum chamber 206 above fluid diffuser 214 as shown in FIG. 7) than in the region of plenum chamber 206 between fluid inlet 212 and fluid diffuser 214 (i.e., in the region of plenum chamber 206 below fluid diffuser 214 as shown in FIG. 7).

In certain exemplary embodiments, fluid diffuser 214 may comprise stainless steel, aluminum, Inconel, a ceramic material, or a polymeric material. Perforations or orifices 216 may, for example, have diameters ranging from about 0.1 millimeter to about 1 millimeter.

FIGS. 9A-9D show top perspective views of slide gates 210A-D in accordance with embodiments disclosed herein. As shown in FIG. 9A, slide gate 210A comprises a plurality of apertures 218A that are of approximately the same size, shape, and distance relative to each other. As shown in FIG. 9B, slide gate 210B comprises a plurality of apertures 218B that are of approximately the same size and shape but of different relative distance to each other. Specifically, slide gate 210B comprises a higher density of apertures 218B near its end regions than in its center region. As shown in FIG. 9C, slide gate 210C comprises a plurality of apertures 218C that are of approximately the same size and shape but of different relative distance to each other. Specifically, slide 210C comprises a lower density of apertures 218C near its end regions than in its center region. As shown in FIG. 9D, slide gate 210D comprises a plurality of apertures 218D, at least some of which are of differing size, shape, or distance relative to each other.

In certain exemplary embodiments, slide gates 210A-D may comprise stainless steel, aluminum, Inconel, a ceramic material, or a polymeric material. Apertures 218A-D may, for example, have diameters ranging from about 1 millimeter to about 1 centimeter.

Figures 10, 11, 12:
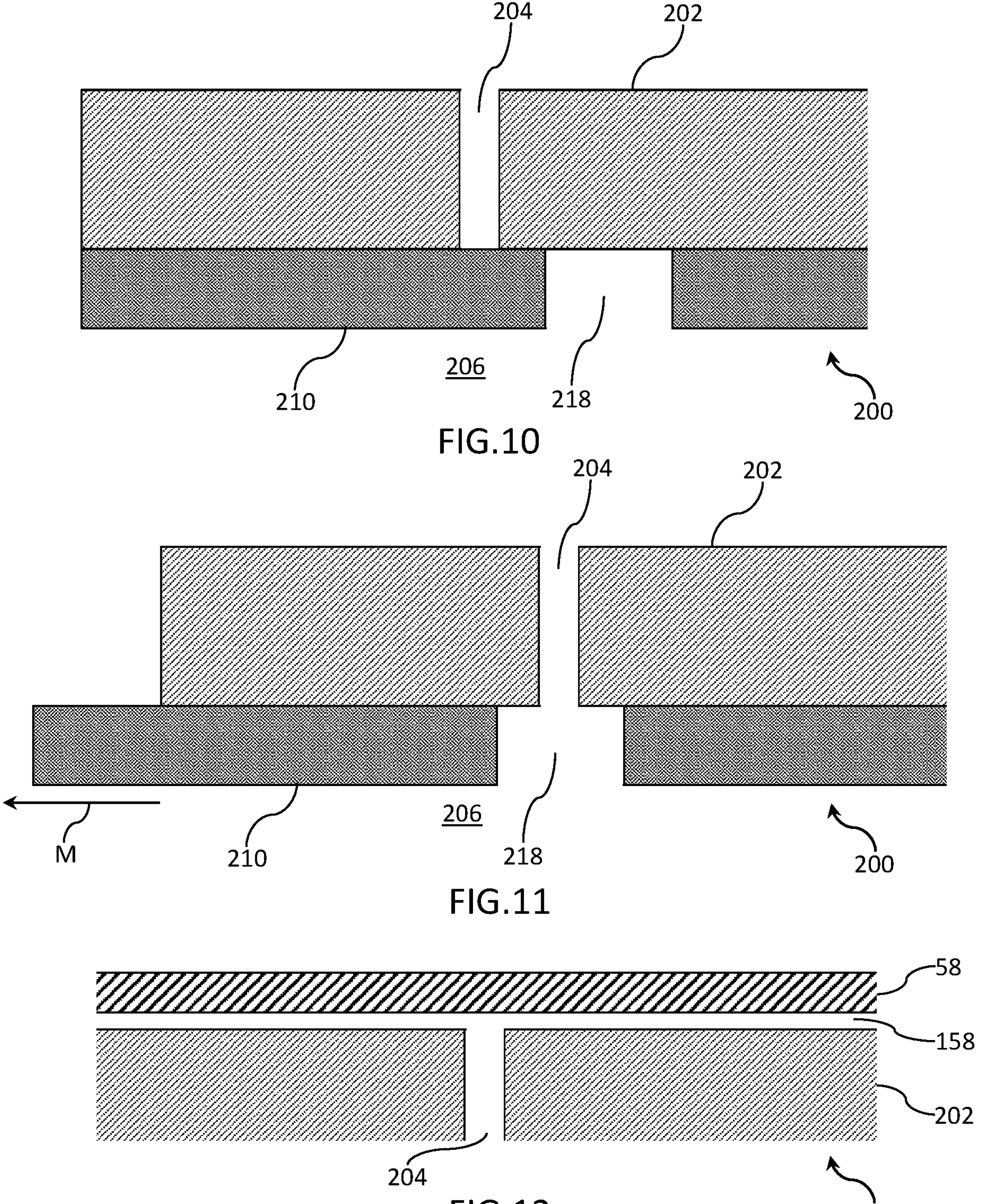
FIG. 10 is a side cutaway perspective view of a portion of a glass conveyance apparatus in accordance with embodiments disclosed herein.
FIG. 11 is a side cutaway perspective view of a portion of a glass conveyance apparatus in accordance with embodiments disclosed herein.
FIG. 12 is a side cutaway perspective view of a glass ribbon and a portion of a glass conveyance apparatus in accordance with embodiments disclosed herein.

FIGS. 10 and 11 show side cutaway perspective views of a portion of a glass conveyance apparatus 200 in accordance with embodiments disclosed herein. Specifically, FIG. 10 shows a portion of a fluid bearing table 202 and a portion of a slide gate 210 positioned in a first position relative to fluid bearing table 202. As shown in FIG. 10, while slide gate 210 is positioned adjacent to and beneath fluid bearing table 202, orifice 204 of fluid bearing table 202 is not in fluid communication with aperture 218 of slide gate 210 such that plenum chamber 206 is not in fluid communication with orifice 204. In contrast, FIG. 11 shows the portion of fluid bearing table 202 and the portion of slide gate 210 positioned in a second position relative to fluid bearing table 202, wherein slide gate 210 has been moved relative to fluid bearing table 202 as indicated by arrow 'M.' As shown in FIG. 11, orifice 204 of fluid bearing table 202 is axially aligned with aperture 218 of slide gate 210 such that orifice 204 of fluid bearing table 202 is in fluid communication with aperture 218 of slide gate 210 and, consequently, plenum chamber 206 is in fluid communication with orifice 204.

Accordingly, embodiments disclosed herein include those in which plenum chamber 206 is not in fluid communication with at least one orifice 204 when at least one slide gate 210 is in the first position (as shown, for example, in FIG. 10) and the plenum chamber 206 is in fluid communication with at least one orifice 204 when at least one slide gate 210 is in the second position (as shown, for example, in FIG. 11).

FIG. 12 show a side cutaway perspective view of a glass ribbon 58 and a portion of a glass conveyance apparatus 200 in accordance with embodiments disclosed herein. Specifically, FIG. 12 shows that glass ribbon 58 can be positioned and/or conveyed above fluid bearing table 202 such that a fluid cushion 158 extends between fluid bearing table 202 and glass ribbon 58. Fluid cushion 158 can be generated, for example, when at least one slide gate 210 is in the second position (as shown, for example, in FIG. 11) such that the plenum chamber 206 is in fluid communication with at least one orifice 204 such that fluid from plenum chamber 206 flows through orifice 204 toward glass ribbon 58 (such that plenum chamber 206 can be in fluid communication with glass ribbon 58), which, in turn, facilitates elevation of glass ribbon 58 on fluid cushion 158.

In certain exemplary embodiments, glass ribbon 58 positioned and/or conveyed above fluid bearing table 202 has a thickness of less than about 0.5 millimeters, such as less than about 0.4 millimeters, and further such as less than about 0.3 millimeters, and yet further such as less than about 0.2 millimeters, such as from about 0.1 millimeter to about 0.5 millimeters, including from about 0.2 millimeters to about 0.4 millimeters.

By moving one or more slide gates 210 relative to fluid bearing table 202, the overall amount of fluid communication between plenum chamber 206 and glass ribbon 58 can be varied or adjusted. For example, embodiments disclosed herein include those in which none, some, or all of the plurality of slide gates 210 are in the first position or the second position and/or are moved from the first position to the second position. For example, depending on the configuration of the slide gates 210, including aperture arrangement on slide gates 210 (as shown, for example, in FIGS. 9A-9D), and configuration of fluid bearing table 202, including orifice 204 arrangement on fluid bearing table 202, movement of slide gates 210 can result in a certain percentage of orifices 204 being in fluid communication with plenum chamber 206 (i.e., via fluid flow through apertures of slide gates 210).

For example, when at least one of the plurality of slide gates 210 are in the first position, less than about 75%, such as less than about 50%, and further such as less than about 25%, and yet further such as less than about 10%, such as from about 0% to about 75%, and further such as from about 1% to about 50%, and yet further such as from about 2% to about 25%, and still yet further such as from about 3% to about 10% of the orifices 204 may be in fluid communication with plenum chamber 206. Conversely, when at least one of the plurality of slide gates 210 are in the second position, greater than about 25%, such as greater than about 50%, and further such as greater than about 75%, and yet further such as greater than about 90%, such as from about 25% to about 100%, and further such as from about 50% to about 99%, and yet further such as from about 75% to about 98%, and still yet further such as from about 90% to about 97% of the orifices 204 may be in fluid communication with plenum chamber 206.

Accordingly, fluid cushion 158 between fluid bearing table 202 and glass ribbon 58 can be dynamically controlled or adjusted in real time by movement of one or more of the plurality of slide gates 210 between, for example, the first and second positions. For example, depending on the process conditions, including the geometry (e.g., width and/or thickness) and/or draw speed of the glass ribbon 58, the overall pressure exerted on glass ribbon 58 by glass conveyance apparatus 200 can be controlled or adjusted by controlling or adjusting one or more of the plurality of slide gates 210.

Figures 13, 14:
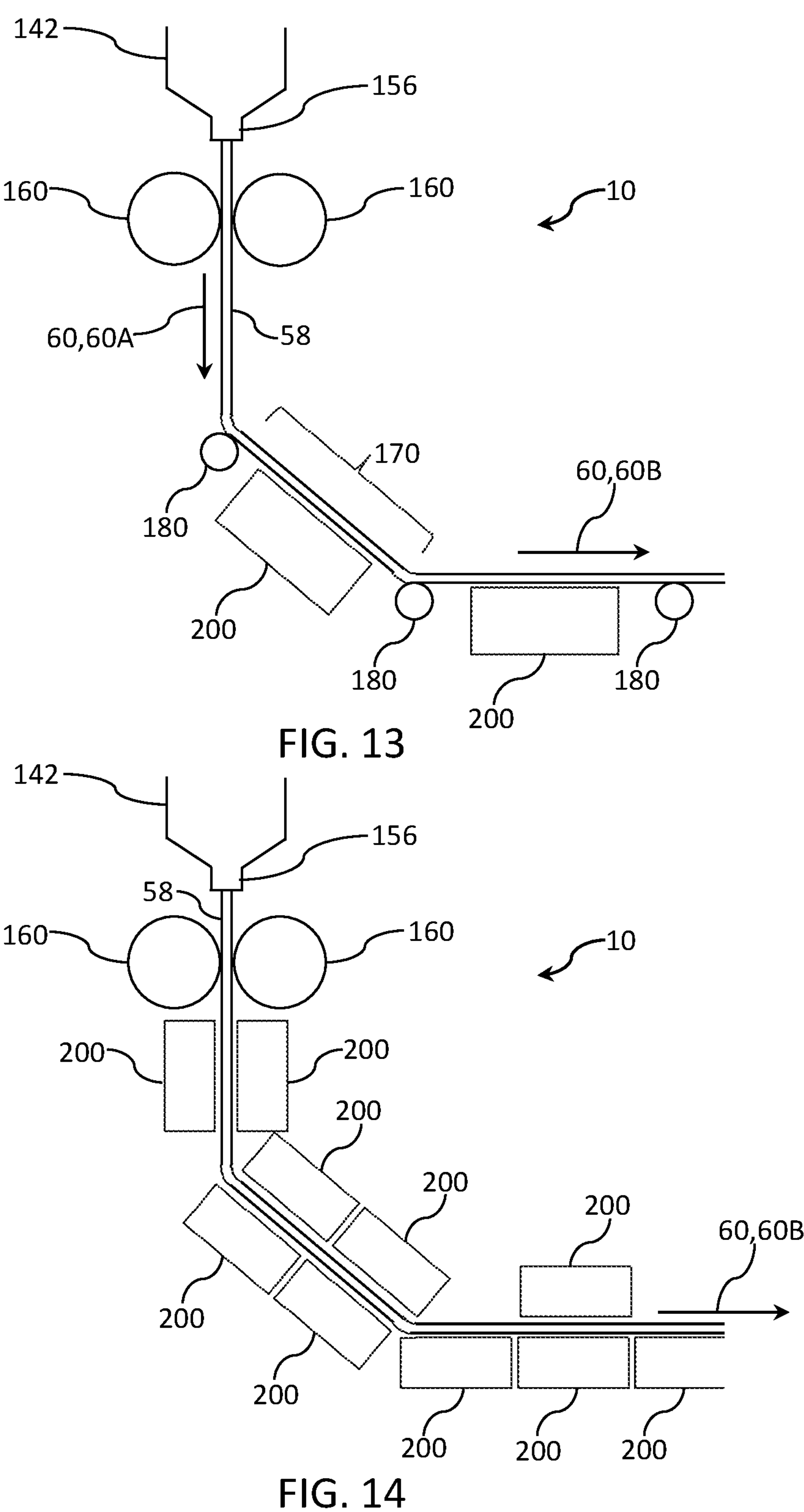
FIG. 13 is a side schematic perspective view of an example glass manufacturing apparatus and process in accordance with embodiments disclosed herein.
FIG. 14 is a side schematic perspective view of an example glass manufacturing apparatus and process in accordance with embodiments disclosed herein.

FIGS. 13 and 14 show side schematic perspective views of an example glass manufacturing apparatus 10 and process in accordance with embodiments disclosed herein. Glass manufacturing apparatus 10 and process of FIGS. 13 and 14 is similar to that of FIG. 2 except that in FIGS. 13 and 14, one or more glass conveyance apparatuses 200 have been positioned along the draw direction 60 of glass ribbon 58 (and have replaced some or all of rollers 180).

Specifically, FIG. 13 shows a glass conveyance apparatus 200 positioned below glass ribbon 58 along a substantially horizontal 60B draw direction 60. FIG. 13 also shows a glass conveyance apparatus 200 positioned below glass ribbon 58 and between a substantially vertical 60A and a substantially horizontal 60B draw direction 60 (i.e., oriented at an oblique angle relative to the substantially vertical 60A and substantially horizontal 60B draw direction 60). In addition, FIG. 13 shows rollers 180 positioned along draw direction 60 and between and/or around glass conveyance apparatuses 200 such that FIG. 13 illustrates a glass manufacturing apparatus 10 comprising both rollers 180 and glass conveyance apparatuses 200.

As with FIG. 13, FIG. 14 also shows at least one glass conveyance apparatus 200 positioned below glass ribbon 58 along a substantially horizontal 60B draw direction 60 as well as at least one glass conveyance apparatus 200 positioned below glass ribbon 58 and between a substantially vertical 60A and a substantially horizontal 60B draw direction 60. In addition, FIG. 14 shows two oppositely facing glass conveyance apparatuses 200 positioned along a substantially vertical 60A draw direction 60 (i.e., positioned on both sides of glass ribbon 58 along a substantially vertical 60A draw direction 60). FIG. 14 also shows a glass conveyance apparatus 200 positioned above glass ribbon 58 along a substantially horizontal 60B draw direction 60 as well as two glass conveyance apparatus 200 positioned above glass ribbon 58 and between a substantially vertical 60A and a substantially horizontal 60B draw direction 60.

In addition, more than one glass conveyance apparatus 200 may be positioned along a widthwise direction of glass ribbon 58, such as in situations where a very wide glass ribbon 58 is conveyed along draw direction 60.

In certain exemplary embodiments, glass conveyance apparatus 200 can include or provide a cooling mechanism and/or a heating mechanism to effect heat transfer between the glass conveyance apparatus 200 and the glass ribbon 58. Cooling mechanism may, for example, result from normal operation of glass conveyance apparatus 200 wherein fluid from plenum chamber 206 flows through orifices 204 toward glass ribbon 58. In addition, the cooling mechanism may include one or more components to provide additional heat transfer between the glass conveyance apparatus 200 and the glass ribbon 58 such as convection enhancers (e.g., cooling fans) and/or systems comprising circulating cooling fluids, such as multiphase cooling systems. The heating mechanism may, for example, include electrically resistive-based, combustion-based, or induction-based heating components.

Embodiments disclosed herein can enable the manufacture of thin and/or wide glass articles, such as thin and/or wide glass sheets with flat surfaces having minimal surface defects, such as glass sheets having a thickness of less than about 0.5 millimeters, such as less than about 0.4 millimeters, and further such as less than about 0.3 millimeters, and yet further such as less than about 0.2 millimeters, such as from about 0.1 millimeter to about 0.5 millimeters, including from about 0.2 millimeters to about 0.4 millimeters.

While the above embodiments have been described with reference to fusion down draw and slot draw process, it is to be understood that such embodiments are also applicable to other glass forming processes, such as float processes, up-draw processes, and press-rolling processes.

Such processes can be used to make glass articles, which can be used, for example, in electronic devices as well as for other applications.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A glass conveyance apparatus comprising:

a plenum chamber comprising a fluid inlet;

a plurality of slide gates, each slide gate of the plurality of slide gates comprising a plurality of apertures, and each slide gate is movable from a first position to a second position;

a fluid bearing table proximate the plurality of slide gates, the fluid bearing table comprising a plurality of orifices comprising a first set of orifices are configured to be selectively placed in fluid communication with the plenum chamber by a first slide gate of the plurality of slide gates; and wherein, at least a first orifice of the first set of orifices is blocked from fluid communication with the plenum chamber by the first slide gate of the plurality of slide gates when the first slide gate is in the first position while at least a second orifice of the first set of orifices is at least partially aligned with an aperture of the plurality of apertures of the first slide gate to provide fluid communication between the second orifice and the plenum chamber when the first slide gate is in the first position.

2. The glass conveyance apparatus of claim 1, further comprising a fluid diffuser between the fluid inlet and the plurality of slide gates.

3. The glass conveyance apparatus of claim 1, wherein at least a first aperture of the plurality of apertures of the first slide gate does not have the same size as at least a second aperture of the plurality of apertures of the first slide gate, the first aperture does not have the same shape as the second aperture, and/or a spacing between at least a first pair of adjacent apertures of the plurality of apertures of the first slide gate is not the same as a spacing between at least a second pair of adjacent apertures of the plurality of apertures of the first slide gate, wherein the plurality of apertures are spaced apart along an axis in a slide direction.

4. The glass conveyance apparatus of claim 1, wherein the fluid bearing table comprises a substantially planar surface.

5. The glass conveyance apparatus of claim 1, wherein the fluid bearing table comprises a non-planar surface.

6. The glass conveyance apparatus of claim 1, further comprising at least one of a heating mechanism or a cooling mechanism.

7. The glass conveyance apparatus of claim 1, wherein the first set of orifices of the plurality of orifices are configured to be selectively placed in fluid communication with the plenum chamber by the first slide gate, and less than about 75% of the first set of orifices are in fluid communication with the plenum chamber when the first slide gate is in the first position.

8. The glass conveyance apparatus of claim 7, wherein from about 1% to about 50% of the first set of orifices are in fluid communication with the plenum chamber when the first slide gate is in the first position.

9. The glass conveyance apparatus of claim 7, wherein greater than about 25% of the first set of orifices are in fluid communication with the plenum chamber when the first slide gate is in the second position.

10. The glass conveyance apparatus of claim 1, wherein the first set of orifices of the plurality of orifices are configured to be selectively placed in fluid communication with the plenum chamber by the first slide gate, and greater than about 25% of the first set of orifices are in fluid communication with the plenum chamber when the first slide gate is in the second position.

11. The glass conveyance apparatus of claim 10, wherein from about 50% to about 99% of the first set of orifices are in fluid communication with the plenum chamber when the first slide gate is in the second position.

12. A manufacturing apparatus for manufacturing a glass article comprising:

the glass conveyance apparatus of claim 1; and a forming device configured to flow a glass ribbon therefrom along a glass ribbon conveyance path defined by the manufacturing apparatus, and toward the glass conveyance apparatus in a draw direction of the glass ribbon conveyance path.

13. The manufacturing apparatus of claim 12, wherein the plurality of slide gates are moveable in the draw direction.

14. The manufacturing apparatus of claim 12, wherein the plurality of slide gates are moveable in a direction perpendicular to the draw direction.

15. The manufacturing apparatus of claim 12, wherein the apparatus further comprises a reorientation mechanism configured to reorient the draw direction from substantially vertical between the forming device and the reorientation mechanism to substantially horizontal downstream of the reorientation mechanism.

16. The manufacturing apparatus of claim 15, wherein the glass conveyance apparatus is positioned between a first portion of the glass ribbon conveyance path extending in a substantially vertical direction and second portion of the glass ribbon conveyance path extending in a substantially horizontal direction.

17. The manufacturing apparatus of claim 12, wherein the glass conveyance apparatus comprises two oppositely facing glass conveyance apparatuses with the glass ribbon conveyance path extending between the oppositely facing glass conveyance apparatuses.

18. A glass conveyance apparatus comprising:

a plenum chamber comprising a fluid inlet;

a plurality of slide gates, each slide gate of the plurality of slide gates comprising a plurality of apertures, and each slide gate is movable from a first position to a second position, wherein all of the plurality of apertures of the slide gate do not have the same size, all of the plurality of apertures of the first slide gate do not have the same shape, and/or a spacing between at least a first pair of adjacent apertures of the plurality of apertures of the slide gate is not the same as a spacing between at least a second pair of adjacent apertures of the plurality of apertures of the first slide gate;

a fluid bearing table proximate the plurality of slide gates, the fluid bearing table comprising a plurality of orifices; and wherein, a first set of orifices of the plurality of orifices are configured to be selectively placed in fluid communication with the plenum chamber by a first slide gate of the plurality of slide gates, at least a first orifice of the first set of orifices is blocked from fluid communication with the plenum chamber by the first slide gate when the first slide gate is in the first position while at least a second orifice of the first set of orifices is at least partially aligned with an aperture of the plurality of apertures of the first slide gate to provide fluid communication between the second orifice and the plenum chamber when the first slide gate is in the first position, and less than about 75% of the first set of orifices are in fluid communication with the plenum chamber when the first slide gate is in the first position.

19. The glass conveyance apparatus of claim 18, wherein from about 1% to about 50% of the first set of orifices are in fluid communication with the plenum chamber when the first slide gate is in the first position.

20. A glass conveyance apparatus comprising:

a plenum chamber comprising a fluid inlet;

a plurality of slide gates, each slide gate of the plurality of slide gates comprising a plurality of apertures, and each slide gate is movable from a first position to a second position, wherein all of the plurality of apertures of the slide gate do not have the same size, all of the plurality of apertures of the first slide gate do not have the same shape, and/or a spacing between at least a first pair of adjacent apertures of the plurality of apertures of the slide gate is not the same as a spacing between at least a second pair of adjacent apertures of the plurality of apertures of the first slide gate;

a fluid bearing table proximate the plurality of slide gates, the fluid bearing table comprising a plurality of orifices; and wherein, a first set of orifices of the plurality of orifices are configured to be selectively placed in fluid communication with the plenum chamber by a first slide gate of the plurality of slide gates, at least a first orifice of the first set of orifices is blocked from fluid communication with the plenum chamber by the first slide gate when the first slide gate is in the first position while at least a second orifice of the first set of orifices is at least partially aligned with an aperture of the plurality of apertures of the first slide gate to provide fluid communication between the second orifice and the plenum chamber when the first slide gate is in the first position, and greater than about 25% of the first set of orifices are in fluid communication with the plenum chamber when the first slide gate is in the second position.

21. The glass conveyance apparatus of claim 20, wherein from about 50% to about 99% of the first set of orifices are in fluid communication with the plenum chamber when the first slide gate is in the second position.

22. The glass conveyance apparatus of claim 20, wherein less than about 75% of the first set of orifices are in fluid communication with the plenum chamber when the first slide gate is in the first position.

* * * * *